United States Patent Office 3,402,153
Patented Sept. 17, 1968

3,402,153
POLYMERISATION PRODUCTS FROM MONOMERIC ESTERS OF α,β-UNSATURATED CARBOXYLIC ACIDS CONTAINING A CYCLOALIPHATIC RING IN THE ALCOHOL RESIDUE AND METHOD FOR THEIR PREPARATION
Horst Jaeger, Bettingen, Rosemarie Toepfl, Basel, and Arthur Maeder, Therwil, Switzerland, assignors to Ciba Limited, Basel, Switzerland, a Swiss company
No Drawing. Filed Nov. 30, 1964, Ser. No. 415,222
Claims priority, application Switzerland, Dec. 2, 1963, 14,695/63
5 Claims. (Cl. 260—78.5)

The subject of this invention are new polymerisation products obtained by polymerising monomeric esters of α,β-unsaturated carboxylic acids containing a cycloaliphatic ring in the alcohol radical, together with (b) other ethylenic unsaturated monomeric compounds suitable for copolymerisation.

These monomeric esters have the form

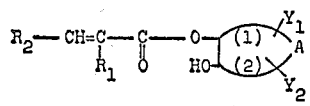 (Ia)

or

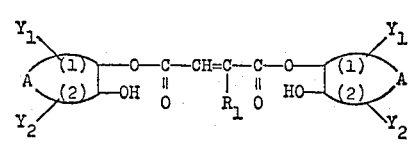 (Ib)

or

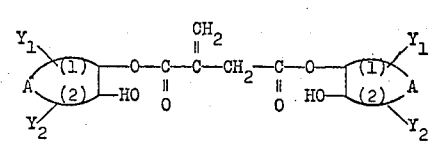 (Ic)

where $R_1$ and $R_2$ represent hydrogen atoms or methyl groups, A forms a saturated cycloaliphatic ring or ring system with 5 to 10 endocyclic carbon atoms, together with the carbon atoms numbered (1) and (2), where the endocyclic carbon atoms numbered (1) and (2) are vicinal, and where this cycloaliphatic ring can be substituted by aliphatic hydrocarbon radicals, as for instance lower alkyl groups with 1 to 4 carbon atoms and where the radical $Y_1$ represents a hydroxyl group of the formula —$CH_2O$—Z, where Z is a hydrogen atom or represents an aliphatic, cycloaliphatic or aromatic radical bonded to the —$CH_2$-group by an ether, acetal or ester linkage, a group —CHO or a radical of the formula

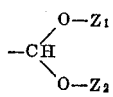

where $Z_1$ and $Z_2$ represent each either monovalent aliphatic or cycloaliphatic radicals or together a bivalent aliphatic or cycloaliphatic radical, and where the radical $Y_2$ represents a hydrogen atom or a group of the formula —$CH_2O$—Z, where Z has the same significance as above.

The starting material for the preparation of the monomeric esters (a) are α=β-unsaturated mono- and di-carboxylic acids or their anhydrides which contain 3 to 5 carbon atoms, such as acrylic acid, methacrylic acid, crotonic acid, fumaric acid, maleic acid, citraconic acid and itaconic acid.

The symbol

in the general Formulae Ia, Ib and Ic for the monomeric esters (a) represents a saturated cycloaliphatic ring or ring system with 5 to 10 endocyclic carbon atoms and particularly such a ring system which is derived from cyclopentane, cyclohexane, endomethylenecyclohexane or from tetrahydrodicyclopentadiene (tricyclo [5,2,1,0$^{2,6}$]-decane). A free hydroxyl group is bonded with a secondary carbon atom of the cycloaliphatic ring. Another hydroxyl group which is esterified by the α:β-unsaturated carboxylic acid is placed adjacent to this hydroxyl group, i.e. in 1,2-position. Furthermore, the cycloaliphatic radical is substituted either (1) by one or two —$CH_2OH$, —$CH_2O$—M or $$-CH_2-O-\overset{O}{\underset{\|}{C}}-M$$

groups, where M may be a substituted alkyl, cycloalkyl or aryl radical, or (2) by a hydroxyl group or an aldehyde group, —CHO, or their acetals under certain conditions, from substituted monovalent or polyvalent alcohols like methanol, ethanol, glycerol, trimethylolpropane, pentaerythritol or 1,1-dimethylolcyclohexene-3. Formula Ia represents the preferably used ester of acrylic acid, methacrylic acid and crotonic acid. Formula Ib represents the esters of maleic acid, fumaric acid and citraconic acid. Formula Ic represents the esters of itaconic acid.

The monomeric esters can be produced in accordance with the general Formulae Ia, Ib and Ic by reaction of the α:β-unsaturated acids with cycloaliphatic 1,2-monoepoxides of the general formula:

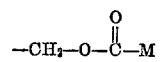

where A, together with the two carbon atoms of the epoxide group, represents a cycloaliphatic ring system of 5 to 10 carbon atoms and $Y_1$ and $Y_2$ have the same significance as in the Formulae Ia to Ic.

During the reaction the 1,2-epoxide group is split, which produces the arrangement:

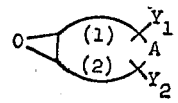

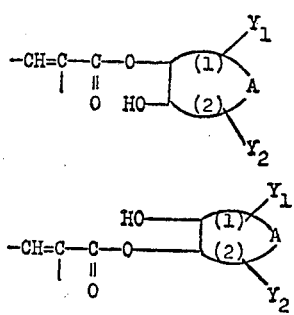

The reaction of the 1,2-epoxides with α:β-unsaturated carboxylic acid is best carried out at a molar ratio of 1:1 and with sodium acetate as catalyst and also in solution. A suitable solvent is, for instance, ethyl acetate. This is an exothermic reaction and must be controlled to avoid exceeding a temperature of 70° C. after completed reaction.

Another possibility of producing monomeric esters is the use of mono-unsaturated compounds of the general formula:

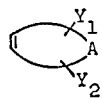   III where $Y_1$ and $Y_2$ have the same significance as above. The esterification of the unsaturated cycloaliphatic compounds takes place in the presence of epoxidising agents, preferably in accordance with the methods described in the U.S. patent application No. 184,582, filed Apr. 2, 1962 by G. Benzing et al.

Suitable starting materials for the preparation of the monomeric esters are the following cycloaliphatic alcohols and aldehydes: cyclopentenol, tetrahydrobenzyl alcohol, tetrahydrobenzaldehyde, 1,1-dimethylolcyclohexene-3 and dihydro-dicyclopentadienol (exo-tricyclo-[5,2,1,0$^{2,6}$] decene-3-ol-8 or -9) or the corresponding 1,2-monoepoxides. The derivatives obtainable by etherification, acetalisation or esterification of the hydroxyl groups or aldehyde groups contained in the aforementioned starting materials can also be subject to epoxidisation or to direct esterification in the presence of epoxidising agents. The following acrylic acid esters and methacrylic acid esters are named as examples of esters produced by the method described in this invention:

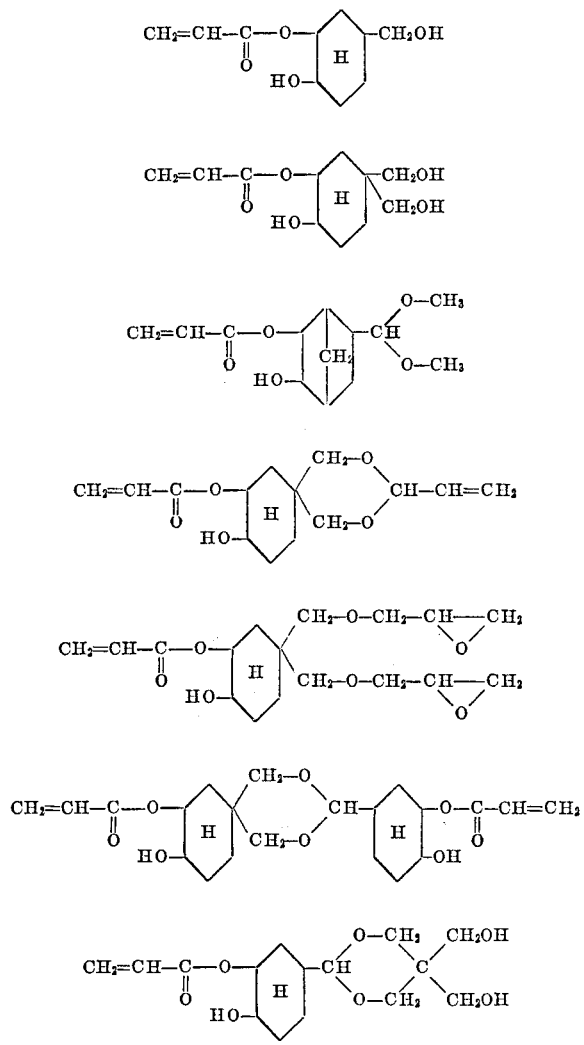

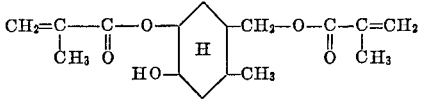

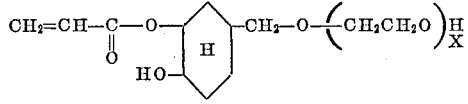

X=1 bis 100

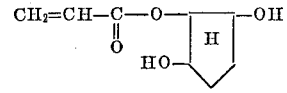

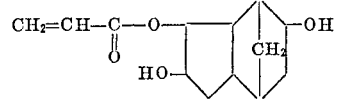

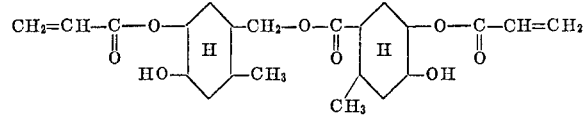

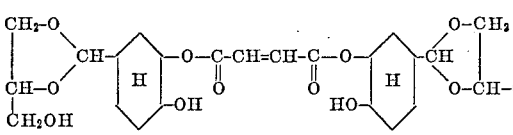

The polymerisation in accordance with the invention of the monomeric compounds according to the Formulae Ia to Ic can proceed to linear high polymers either in solution or in emulsion and in the presence of catalysts yielding free radicals or with ionising action either with itself or with another compound in accordance with the formulae Ia to Ic or with other compounds suitable for polymerisation. The products obtained are linear polymer homologues, unipolymers or linear multipolymers, depending on the choice of the starting materials. Polymer homologues are obtained by using only identical monomers, unipolymers are obtained by using two or several monomers, which correspond exclusively the general Formulae Ia to Ic, and multipolymers by using at least one monomer of the general Formulae Ia to Ic and at least one other polymerisable monomer, see "Die Makromolekulare Chemie," vol. 38 (1960), p. 2. Suitable monomeric compounds for the preparation of multipolymers are:

(a) vinylesters of organic acids, e.g. vinylacetate, vinylformate, vinylbutyrate, vinylbenzoate, (b) vinylalkylketones and vinylalkylethers like vinylmethylketone and vinylbutylether, (c) vinylhalogenides like vinylchloride, vinylfluoride, vinylidenechloride, (d) vinylaryl compounds like styrene and substituted styrenes, (e) derivates of the acrylic acid series like acrylonitrile or acrylamide and preferably its amide-nitrogen substituted derivatives like N-methylolacrylamide, N-methylolacrylamide alkyl ether, N,N-dihydroxyethylacrylamide, N-tert-butylacrylamide and hexamethylolmelamine triacrylamide, (f) especially esters of the acrylic acid series, like esters from acrylic acid, methacrylic acid, α-chloroacrylic acid, crotonic acid, maleic acid, fumaric acid or itaconic acid and mono- or dialcohols with 1 to 18 carbon atoms or phenols, e.g. ethylacrylate, glycidylacrylate, butylacrylate, acrylic acid monoglycol ester or dodecylacrylate, and (g) olefins which can be polymerised, like isobutylene butadiene, or 2-chlorobutadiene.

Preferred use is made of vinylchloride, vinylidenechloride, acrylic acid, methacrylic acid, fumaric acid, itaconic acid and its esters like acrylic acid ethyl ester, acrylic acid butylester, acrylic acid glycidylester, glycolmonoacrylate, also calcium acrylate, acrylamide, methacrylamide, N - methylolacrylamide, N - methylolacrylamidemethylether, N-tertiary-butylacrylamide, vinylacetate, acrylonitrile, styrene, methylstyrene and butadiene.

The high polymers are generally composed of 5–100% of a compound of the general Formulae Ia, Ib or Ic and of 95–0% of another compound. High polymers containing 5 to 30 and preferably 8 to 20 percent by weight of the polymerised monomeric ester of the Formulae Ia to Ic calculated as percentage of the total weight of the monomers, possess particularly interesting technical properties among these high polymers. The binary or tertiary mixed polymers containing in the polymerised state an acrylic acid ester, like butylacrylate, and possibly a third monomer, in particular a vinylester, like vinylacetate, apart from the 5–30 percent by weight of the ester as defined by the Formulae Ia to Ic, possess particularly favourable technical properties, especially in the field of textile finishing.

The preparation of high polymers by mixed polymerisation of esters of Formulae Ia to Ic with one or several other ethylenically unsaturated monomers suitable for copolymerisation is carried out by the usual methods, i.e. by blockpolymerisation, beadpolymerisation, emulsionpolymerisation or preferably by solvent polymerisation in an organic solvent, suitable for the purpose, as for instance, acetone, benzene, sym-dichlorethane or ethylacetate.

The polymerisation of this invention is carried out best at elevated temperature, preferably at the boiling temperature of the solvent and by adding catalysts with ionic effect or peroxide catalysts or other catalysts forming free radicals which are soluble in the medium of the reaction, such as benzoylperoxide, lauroylperoxide or $\alpha,\alpha'$-azoisobutyrodinitrile.

The polymer compounds are obtained in the form of viscous solutions, granulates or emulsions according to the nature of the polymerisation conditions of the monomeric starting materials used.

It is also possible to perform the polymerisation of the monomeric compounds of this invention in the presence of substrates. It can be performed, for instance, on glass fibre fabric or textile material. The relative substrate is suitably impregnated in this case with solutions or emulsions of the monomers, and the polymerisation is subsequently effected by heating of the material in the presence of a polymerisation catalyst.

Because of the presence of free hydroxyl groups the mixed polymers of this invention react with compounds which contain several functional groups capable of reacting with hydroxyl groups, such as 1,2-epoxide groups, isocyanate groups, acrylyl groups, methylol groups, methylol groups etherified with low alcohols, aldehyde groups, readily hydrolizable ester groups, etc. Such polyfunctional compounds are therefore suitable as wetting or hardening components for the mixed polymers of the invention containing hydroxyl groups.

As suitable wetting components may be mentioned especially: expoxide compounds, particularly polyglycidyl ethers, like butanedioldiglycidylether and diglycidyl ether, di- and polyisocyanate, such as ortho-, meta-, and para-phenylenediisocyanate, toluylene - 2,4 - diisocyanate, 1,5-naphthylenediisocyanate; acrylylic compounds like methylenebisacrylamide and sym. triacrylylperhydrotriazine, boroxine, like trimethoxyboroxine; titanic acid ester, like n-butyltitanate; alkyl-ortho-silicate, like ethylorthosilicate; poly(2,3-dihydro-1,4-pyranyl)-compounds, like 2,3-dihydro-1',4'-pyran-2'-yl)-methylester; aldehydes, like formaldehyde or glyoxal, soluble phenol-formaldehyde condensation products, like novolaks or resoles. Aminoplasts soluble in water or organic solvents are preferably used as wetting components. Suitable are the formaldehyde condensation products of urea, thiourea, guanidene, acetylendiurea, dicyandiamide, further, those of aminotriazines, like melamine or of guanamines, like acetoguanamine, benzoguanamine, tetrahydrobenzoguanamine or formoguanamine as well as their ethers with alcohols, like methylether-, propyl-, allyl-, butyl-, amyl-, hexylalcohol, cyclohexanol, benzylalcohol, laurylalcohol, stearyl-, oleyl- or abietylalcohol.

Apart from an ether radical the condensation products may also contain a radical of higher molecular acids, e.g. stearic acid.

Especially good technical results in connection with textile finishing are obtained by the use of condensation products of formaldehyde and melamine soluble in water, or by using the esterification product of hexamethylolmelamine methyl ether and stearic acid as wetting components.

The high polymers obtainable by this invention can be used for very many different purposes. They can generally be used wherever polymerisation resins are used. They can be used in the unmodified condition or mixed with the usual additives, such as solvents, softeners, stabilising agents, flame resisting materials, pigments, fillers and extenders for the preparation of plastic masses and moulding compounds, of films, adhesives or lacquers. In form of solutions or emulsions the high polymers are further especially useful as auxiliary agents in the textile, leather, and paper industries, provided they have been prepared from suitable monomeric starting materials. They can be used especially as solutions in organic solvents and in combination with the aforementioned polyfunctional wetting agents, such as polyisocyanates or soluble aminoplasts, for the preparation of soft, water-repelling and, after hardening in organic solvents, like trichlorethylene, insoluble coatings on textile fabrics.

The textile fabrics to be coated may be, for instance, fabrics of native or regenerated cellulose, i.e., cotton, linen, artificial silk or staple fibre or acetyl-cellulose, but particularly fabrics of so-called fully synthetic fibres. Among the latter should be mentioned, for instance, polyester fibres, like Dacron or Terylene (registered trademark), polyacrylonitrile fibres, like Orlon (registered trademark), polyvinylchloride fibres, like Thermovyl (registered trademark), and especially polyamide fibres, like Perlon (registered trademark) or nylon. Thin, closely woven fabrics have, in general, been proved to be particularly suitable.

Such compositions of suitable texture can also be used for the manufacture of decorative and/or protective coatings on the surface of other materials, e.g. sheet metal, wood, glass, ceramic, plastic sheets, etc., furthermore, for the impregnation of paper, cardboard, etc.

The coatings can be applied to the fabrics in the usual manner, i.e. e.g. by dipping the fabrics into the coating substance with subsequent pressing to give the desired content, or a coating machine can be used with advantage, preferably fitted with a scraper mechanism, applying the layer on one side or on both sides of the fabric. Repeated applications of the coating is also possible. In this case, it is advisable to have an intermediate drying period at ambient temperature or at higher temperatures, e.g. at 80 to 100° C.

For the setting of the coating, it is advantageous to increase the temperature to above 100° C. Good results are obtained in most cases at temperatures of 120° C. to 130° C. and a setting time of 5 to 15 minutes. After treating the fabric in this manner, it can be smoothed down, if required, for instance, by a high pressure calender.

A special feature of the hardened layers or protective coatings are their smoothness, even at low temperatures, and their very good adhesion.

The water-repelling, hardened layers on textile fabrics, like nylon fabric, are not only excellently washproof, but they are also chemically resistant against the usual solvents used in chemical dry cleaning processes, i.e. carbon tetrachloride or trichlorethylene. They do not become sticky during an ordinary wash with warm soapy water with addition of soda or during the usual dry cleaning processes, and do not peel off the fabric. The layers are, in general, also resistant to other influences to which they might be subject during general use, i.e. the effect of sunlight, heat, moisture and micro-organisms.

The percentages in the following examples are percentages by weight.

The subsequently mentioned products I, II, III, IV, V and VI are used for the preparation of the polymers covered by the invention, as described in the examples.

Product I

Preparation of a mixture of 1-acryloyloxy-2-hydroxy-4-hydroxymethyl-cyclohexane (1) and 1-acryloyloxy-3-hydroxymethyl-6-hydroxy-cyclohexane (2).

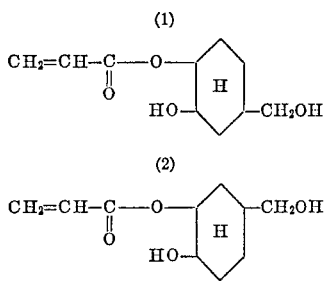

595 g. 3-epoxytetrahydrobenzyl alcohol are dissolved in 1450 ml. of ethylacetate at ambient temperature with 371 g. acrylic acid with addition of 25 g. anhydrous sodium acetate. 0.5 g. hydroquinone are added as stabiliser. The temperature rises to 50° C. and the temperature of the reaction is kept constant at this value. The decrease of the epoxide content is checked by titration. After reacting for eight hours there is still 7.42% epoxide group present. During the night the epoxide content decreases to 0.51%. The solution is then separated from the sodium acetate deposits by filtration, is shaken twice with 250 ml. saturated ammonium sulphate solution containing 10% sodium carbonate, and finally washed twice with 100 ml. saturated ammonium sulphate solution. The ethyl acetate is subsequently distilled off using the water pump. The resulting product (I) obtained in this way contains 99% double bonds calculated for the amount of acrylic acid employed and is free from epoxide groups.

Product II.—1-acryloloxy-2-hydroxy-4,4- or 5,5-dihydroxymethyl-cyclohexane

Charge:

0.09 mol=30 g. 1,1-dihydroxymethyl-3,4-epoxy-cyclohexane
0.09 mol=6.5 g. acrylic acid
9.4 g. dichloroethylene
0.8 g. Na-acetate
0.14 g. hydroquinonemonomethylether The 1,1-(dihydroxymethyl-3,4-epoxy-cyclohexane and the acrylic acid are dissolved in dichlorethylene together with sodium-acetate and hydroquinonemethylether. This causes the temperature to rise to 52° C. The reacting mixture is kept at 70° C. for one hour, and is then continuously stirred for four hours at 40° C.

After the reaction is completed the solution is diluted with 150 ml. ethylacetate and separated from the sodium acetate deposits by filtration. The solution is then shaken twice with 50 ml. saturated ammonium sulphate solution containing 10% sodium carbonate, and finally washed twice with 25 ml. saturated ammonium sulphate solution. The ethyl acetate solution is dried over $(NH_4)_2SO_4$ and the ethylacetate is distilled off. The resulting product (II) contains 99.8% double bonds calculated on the amount of acrylic acid used and is free from epoxide groups.

Product III.—3- (or 4-) acryloyloxy-exo-tricyclo-5,2,1,0$^{2,6}$-decandiol-8 (or -9), -4 (or -3)

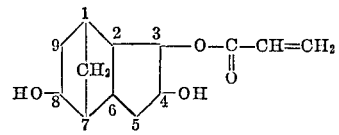

Charge:

0.5 mol=93.8 epoxytricyclodecanol, 3,4-epoxy-exo-tricyclo-5,2,1,0$^{2,6}$-decane-ol-8 (or -9)
0.5 mol=36 g. acrylic acid
2.7 g. sodium acetate
0.2 g. hydroquinone.

Epoxytricyclodecanol is mixed with acrylic acid with addition of sodium acetate and hydroquinone. This raises the temperature within 30 minutes to 60° C. The esterification mixture is then stirred for approximately one hour at 70° C., is then cooled to 40° C. with continuous stirring for 4 hours.

The reaction charge is processed further by diluting with 250 ml. ethyl acetate removing sodium acetate precipates by filtration, shaking twice with 100 ml. saturated ammonium sulphate solution containing 10% sodium carbonate, finally washing twice with 50 ml. saturated ammonium sulphate solution drying with $Na_2SO_4$ and removing ethyl acetate by filtration.

The resulting product (III) contains 95.2% double bonds calculated on the quantity of methacrylic acid used and is free from epoxide groups.

Product IV.—1,1-bis (glycidoxymethyl)-3-methacryloyloxy-4-hydroxycyclohexane

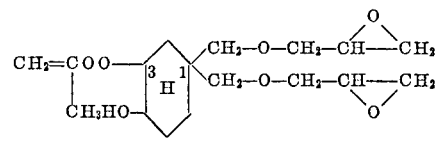

536 g. 1,1 - bis(glycidoxymethyl) - 3 - epoxycyclohexane and 86 g. methacrylic acid are stirred 4 hours at 50° C., with the addition of 10 g. anhydrous Na-acetate, and 10 mg. hydroquinone.

The reaction mixture is cooled, 500 ml. ethylacetate are added and the Na-acetate deposits are removed by filtration. The ethyl acetate is distilled off in vacuum using the water pump.

The resulting product (IV) contains 70% epoxide calculated for the quantity of diglycidylether and 100% double bonds calculated on the quantity of methacrylic acid used. It still contains 5.30% free methacrylic acid per total quantity of acid used.

Product V.—3″-methyl-4″-hydroxy-cyclohexyl-2-spiro-5,5′-1′-methacryl-2′-hydroxycyclohexane-dioxane-1,3

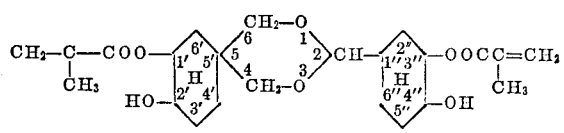

0.7 mol=186 g. [3″,4″-epoxycyclohexyl]-2-spiro[5,5]-[1,2-epoxycyclohexane]-dioxane 1,3 and
1.45 mol=125 g. methacrylic acid are dissolved in 400 ml. ethyl acetate with the addition of 20 g. anhydrous Na-acetate, and 0.5 g. hydroquinone and are stirred 24 hours at 50° C. The Na-acetate deposits are removed from the reaction mixture by filtration and the ethylacetate is drawn off by vacuum distillation with the water jet pump.

The resulting product V contains 100% double bonds calculated for the total quantity of methacrylic acid used. It contains 14% epoxide groups calculated for diepoxide and 7.2% free methacrylic acid calculated for the original amount of acid.

Product VI.—Maleic acid-di-[2-hydroxy-tetrahydrobenzalglycerine-5]ester

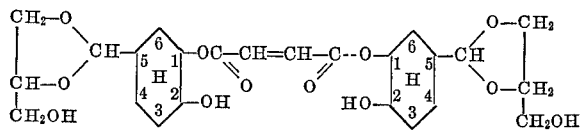

2 mol=422 g. 3,4-epoxytetrahydrobenzalglycerine are stirred 4 hours at 50° C. with
1 mol=116 g. maleic acid, 250 ml. ethyl acetate and 20 g. Na-acetate The reaction mixture is blended with 500 ml. ethyl acetate, and Na-acetate deposits are removed by filtration. The ethylacetate is drawn off by vacuum distillation with the water jet pump.

The resulting product VI contains 77.6% double bonds of the original quantity of maleic acid and is free from epoxide groups. It still contains 1.1% free maleic acid calculated on the original quantity of acid.

EXAMPLE 1

35 parts of product I are heated with 75 parts of ethylalcohol to an internal temperature of 65° C. with continuous stirring in a vessel with nitrogen scavenging. 0.2 part of azoisobutyrodinitrile are added as soon as the temperature is constant. After one hour another 0.1 part azoisobutyrodinitrile is added, and this addition is repeated twice, each time after one additional hour. The resulting resin solution is thin and slightly brown-colored. Films poured with the solution of the resin are sticky and soluble in cold acetone.

If a film is heated 15 minutes at 120° C., it is no longer wholly soluble in cold acetone. A film insoluble in acetone is obtained by the admixture of borontrifluoride-etherate to the resin solution with subsequent hardening for 15 minutes at 120° C.

A resin solution can be produced in the same way, if an equivalent quantity of the products II, V and VI is used in the above example instead of 35 parts of product I.

EXAMPLE 2

An initial emulsion is prepared from 90 parts of n-butylacrylate, 10 parts of product I, 5 parts of an emulgator resin amine and 80 mol of ethyleneoxide esterified with sulfaminic acid with addition of urea, 2 parts of an addition product of 9 mol ethyleneoxide with 1 mol of nonylphenol and 144 parts water by thoroughly mixing together. Half of this emulsion is then poured into a mixing vessel equipped with reflux condenser and thermometer, which has previously been scavenged with nitrogen and has been heated to 63° C. to 65° C. internal temperature. The temperature rises, after adding a solution of 0.2 part of sodium bisulphite in 2 parts of water and 0.05 part of potassium persulphate in 1.5 parts of water. The remaining half of the monomer mixture is then added in drops within 30 minutes. Ten minutes after this dropwise admixture is completed, 0.05 part of potassium persulphate in 1.5 parts of water is added. The addition of the catalyst is repeated 8 times at 30 minute intervals. After a further 5 hours the reaction mixture is cooled to room temperature. The resulting product is a thin, finely dispersed emulsion with 40.0% polymer content.

Films which are poured from the emulsion and have been dried in air are soft, clear and soluble in boiling trichlorethylene.

After hardening 15 minutes at 120° C.: Soluble with pronounced swelling, but not completely soluble in boiling trichlorethylene.

Hardened with magnesiumchloride 15 minutes at 120° C.: insoluble in boiling trichlorethylene.

EXAMPLE 3

A solution of 42.5 parts of n-butylacrylate, 7.5 parts of product I and 75 parts of sym.-dichlorethane is heated to 70° C. in a mixing vessel, equipped with reflux condenser, thermometer and nitrogen supply pipe. As soon as the temperature is constant, 0.1 part of benzylperoxide is added and after 10 minutes a solution of 42.5 parts of n-butylacrylate, 7.5 parts of the monomer mixture of Example 1 and 75 parts of sym-dichlorethane is added in drops within 30 minutes. 10 minutes after the dropwise admixture is completed 0.1 part of benzoylperoxide is added, and this addition is repeated 3 times at intervals of one hour. The temperature of the bath is increased to 80° C. at the last addition of the catalyst. This is followed by 7 hours of after-polymerisation. The resulting resin solution is highly viscous and clear with 40.0% polymer content. Films poured with the resin solution and dried in air are soluble in cold trichloroethylene. After hardening with borontrifluoride-etherate during 15 minutes at 120° C. a film insoluble in boiling trichlorethylene is obtained.

EXAMPLE 4

A preliminary emulsion is prepared from 75 parts of n-butylacrylate, 10 parts of acrylonitrile, 15 parts of product I, 5 parts of an emulgator (resin amine and 80 mol of ethyleneoxide esterified with sulfaminic acid with addition of urea), 2 parts of an addition product from 9 mol of ethyleneoxide with 1 mol nonylphenol and 144 parts of water by thoroughly mixing together. Half of this preliminary emulsion is poured into a mixing vessel, equipped with reflux condenser and thermometer previously scavenged with nitrogen and heated to approximately 64° C. internal temperature. The temperature rises after adding a solution of 0.2 part of sodium-bisulphite in 2 parts of water and 0.05 part of potassium persulphate in 1.5 parts of water. The remaining half of the preliminary emulsion is then added dropwise within 30 minutes. After this dropwise admixture is completed 0.05 part of potassium persulphate in 1.5 parts of water is added. The addition of catalyst is repeated 8 times at 30 minute intervals. The reaction mixture is cooled to room temperature after a further 7 hours. The resulting emulsion is a thin, finely dispersed liquid with 39.2% polymer content.

Films poured with the emulsion and dried in air are soft, elastic and soluble in boiling trichlorethylene.

Hardened for 15 minutes at 120° C.: strongly swelling to soluble in boiling trichlorethylene. Hardened with magnesium chloride during 15 minutes at 120° C.: insoluble and non-swelling in boiling trichlorethylene.

EXAMPLE 5

A preliminary emulsion is prepared from 90 parts of styrene, 10 parts of product I, 5 parts of an emulgator (resin amine and 80 mol of ethylene oxide esterified with sulfaminic acid with admixture of urea) 2 parts of an addition product from 9 mol of ethylene oxide with 1 mol nonylphenol, 3 parts of triethanolamine and 145 parts of water by thoroughly mixing together. One half of the preliminary emulsion is then poured into a mixing vessel fitted with reflux condenser and thermometer previously scavenged with nitrogen and heated to approximately 66° C. internal temperature. The temperature rises after admixing a solution of 0.2 part of sodium bisulphite in 2 parts of water and 0.05 part of potassium persulphate in 1.5 parts of water. The remaining half of the preliminary emulsion, to which 0.1 part of potassium persulphate in 3 parts of water was added, is then run in in the course of 30 minutes. 15 minutes after the dropwise addition is completed, 0.05 part of potassium persulphate in 1.5 parts of water are added, and this addition is repeated 6 times at 30 minute intervals. The reaction mixture is cooled to room temperature after a further 7 hours.

The resulting emulsion is a thin, finely dispersed liquid with 40.2% polymer content.

Films poured with this emulsion and dried in air are milky, brittle and soluble in boiling trichloroethylene.

Hardened for 15 minutes at 120° C.: strong swelling in boiling trichlorethylene. Hardened with magnesium chloride for 15 minutes at 120° C.: Insoluble and practically no swelling in boiling trichlorethylene.

EXAMPLE 6

A solution of 34 parts of vinylacetate, 8.5 parts of n-butylacrylate, 7.5 parts of product I and 75 parts of ethyl acetate is heated in a mixing vessel equipped with reflux condenser, thermometer and nitrogen supply pipe to an internal temperature of approx. 75° C. As soon as the temperature is constant, 0.2 part of benzoylperoxide is added and after 6 minutes a solution of 34 parts of n-butylacrylate, 8.5 parts of vinylacetate, 7.5 parts of the monomer mixture of Example 1 and 75 parts of ethyl acetate is added within 30 minutes. 30 minutes after this dropwise admixture is completed 0.2 part of benzoylperoxide is added and this addition is repeated 3 times in one hourly intervals. This is followed finally by 8 hours polymerising.

The resulting resin solution is highly viscous with 41.0% polymer content.

Films poured with the resin solution and dried in air are clear, soft, slightly sticky and soluble in cold trichlorethylene.

Dried at 100° C. and hardened 5 minutes at 150° C.: swelling, but not soluble in cold trichlorethylene.

EXAMPLE 7

A solution of 35 parts N of vinylpyrrolidone, 15 parts of product I, 122.5 parts of water, 52.5 parts of isopropylalcohol, 0.3 part of concentrated ammonia and 0.2 part of triethylamine is heated to 58° C. in a mixing vessel equipped with reflux condenser, thermometer and nitrogen supply pipe. As soon as the temperature is constant 0.1 part of potassium persulphate in 1 part of water is added. After 30 minutes 0.2 part of potassium persulphate in 2 parts of water are added and polymerising continued for another 14 hours. The resulting resin solution is a thin, clear and colorless liquid.

Films poured with the resin solution and dried at room temperature are sticky and soluble in water.

Hardened with hydrochloric acid for 15 minutes at 120° C.: not sticky, hard, insoluble in water but swelling.

EXAMPLE 8

A preliminary emulsion is prepared from 88 parts of vinylacetate, 10 parts of product I, 2 parts of Ca-acrylate, 2.5 parts of sodium phenyldodecyl sulphonate, 2.5 parts of sodiumlaurylsulphate and 142 parts of water by thoroughly mixing together. One half of this preliminary emulsion is then poured into a mixing vessel equipped with reflux condenser and thermometer previously scavenged with nitrogen and heated to approx. 62° C. internal temperature. The temperature rises after adding 0.2 part of sodiumsulphite in 1.5 parts of water, and the second half of the preliminary emulsion, to which 0.1 part potassium persulphate in 3 parts of water was admixed, is then run in within 60 minutes. After this dropwise admixture is completed, 0.05 part of potassium persulphate in 1.5 parts of water is immediately added and this addition is repeated 5 times at 30 minute intervals. This is finally followed by 7 hours after-polymerisation. The resulting finely suspended emulsion is a thin liquid with 39.6% polymer content.

EXAMPLE 9

A solution of 30 parts of vinylacetate, 15 parts of n-butylacetate, 7.5 parts of product I, 1.5 parts of acetal from 1,1 - bis(hydroxymethyl) - 3,4 - epoxyclohexane and acrolein and 75 parts of ethylacetate is heated to approximately 76° C. in a mixing vessel, equipped with reflux condenser, thermometer and nitrogen supply pipe. As soon as the temperature is constant, 0.3 part of benzoylperoxide is added and after 5 minutes a solution of 30 parts of n-butylacrylate, 7 parts of vinylacetate, 7.5 parts of product I, 1.5 parts of acetal from 1,1-bis(hydroxymethyl)-3,4-epoxycyclohenaxe and acrolein and 75 parts ethylacetate is added in drops within 50 minutes. 30 minutes after completing this dropwise mixture 0.2 part benzoylperoxide is added and this repeated 5 times at one hourly intervals. Then follows after-polymerisation for 8 hours.

The resulting resin solution is of medium viscosity, clear, with 35.2% polymer content.

EXAMPLE 10

Emulsion mixed polymer from n-butylacrylate/vinylidenechloride

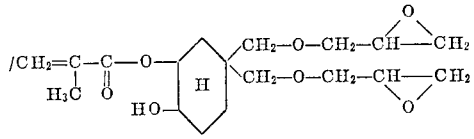

A preliminary emulsion is prepared from 65 parts of n-butylacrylate, 15 parts of vinylidenechloride, 20 parts of product IV, 5 parts of an emulgator (resin amine and 80 mol of ethyleneoxide esterified with sulphaminic acid with addition of urea), 2 parts of an addition product of 9 mol of ethyleneoxide with 1 mol of nonylphenol and 144 parts of water by thoroughly mixing together. One half of this preliminary emulsion is then poured into a mixing vessel equipped with reflux condenser and thermometer previously scavenged with nitrogen and heated to approximately 65° C. to 66° C. internal temperature. The temperature rises after a solution of 0.2 part of sodium-bisulphite in 2 parts of water, as well as 0.05 part of potassium persulphate with 1.5 parts of water has been added, after which the remaining half of the monomer mixture is added dropwise within 30 minutes. During the dropwise admixture 0.05 part of potassium persulphate dissolved in 1.5 parts of water is added and this addition is repeated 7 times at ½ hourly intervals after completing the dropwise admixture. There follows finally 1 hour of polymerising. The resulting emulsion is a thin, clear liquid with 37.8% (theoretically 94.0%) polymers content.

EXAMPLE 11

Emulsion mixed polymer of N-butylacrylate/itaconic acid dimethylester.

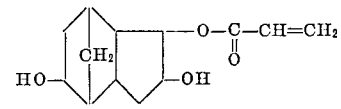

A preliminary emulsion is prepared from 80 parts of n-butylacrylate, 10 parts of dimethylitaconate, 10 parts of product III, 5 parts of the sodium salt of an oleophile alkyl-arylpetroleum sulphonate, 1 part of triethanolamine and 180 parts of water by vigorous mixing. One half of this preliminary emulsion is then poured into a mixing vessel provided with reflux condenser and thermometer previously scavenged with nitrogen and heated to approximately 65° C. internal temperature. After adding a solution of 0.2 part of sodiumbisulphite in 2 parts of water and 0.05 part of potassium persulphate in 1.5 parts of water, the temperature rises, after which the remaining half of the preliminary emulsion is added dropwise within 60 minutes. During the dropwise admixture 0.05 part of potassium persulphate dissolved in 1.5 parts of water are added twice. This addition is repeated 7 times at 30 minute intervals after the dropwise addition has been completed. Subsequently follows an after-polymerisation for 6 hours. The resulting finely dispersed emulsion is a thin liquid with 33.5% (theoretically 99.2%) polymer content.

EXAMPLE 12

Emulsion mixed polymer of n-butylacrylate/vinyl-n-butylether/

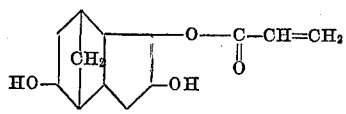

A preliminary emulsion is prepared from 35 parts of n-butylacrylate, 15 parts of product III, 3.5 parts of a sodium salt of an oleophile alkylaryl petroleum-sulphonate, 1 part of triethanolamine and 92 parts of water by vigorous shaking.

This emulsion is poured into a mixing vessel equipped with reflux condenser and thermometer previously rinsed with nitrogen and heated to approximately 65° C. internal temperature. Another preliminary emulsion is then prepared from 35 parts of n-butylacrylate, 15 parts of vinyl-n-butylether, 1.5 parts of the sodium salt of an alkylaryl-petroleumsulphonate, 1 part of triethanolamine and 92 parts of water by vigorous shaking. 0.05 part of potassium persulphate in 1.5 parts of water is then added to the preliminary emulsion heated to 65° C. in the mixing vessel, which causes the temperature to rise, and the separately prepared preliminary emulsion is then added in drops within 30 minutes. Two portions of 0.05 part of potassium persulphate in 1.5 parts of water each are added twice during the dropwise admixture, and this is repeated 7 times at intervals of 30 minutes. Subsequently follows an after-polymerisation for 6 hours. The resulting, finely dispersed emulsion is a thin liquid with 34.2% (theoretically 96.5%) polymer content.

EXAMPLE 13

Solution mixed polymer of ethylacrylate/N-tert. butylacrylamide

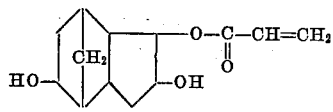

A solution of 80 parts of ethylacrylate, 12 parts of N-tert. butylacrylamide, 8 parts of product III and 235 parts of ethyl-alcohol are heated in a mixing vessel fitted with reflux condensers and thermometer previously rinsed with nitrogen to approx. 65° C. of 0.2 g. of benzylperoxide is then added 5 times at intervals of 1 hour with subsequent after-polymerisation for 2½ hours. The resulting product is a thinly viscous, clear solution with 27% polymer content (89.9% theoretically).

EXAMPLE 14

Cotton fabric, nylon, Terylene and Terylene-cotton fabrics are impregnated wtih the following preparation:

38 g./l. aqueous emulsion, containing 39.2% mixed polymer of 75 parts of n-butylacrylate
10 parts of acrylonitrile and 15 parts of product I
20 g./l. aqueous solution containing 75% of a condensation product of hexamethylolmelamine and methanol
25 g./l. 3% sodiumalginate solution
3 g./l. 60% preparation of gas soot, non-ionic emulgator and dioctylphthalate
3 g./l. 50% preparation of the blue pigment I, nonionic emulgator and casein-urea mixture
5 g./l. diammoniumphosphate.

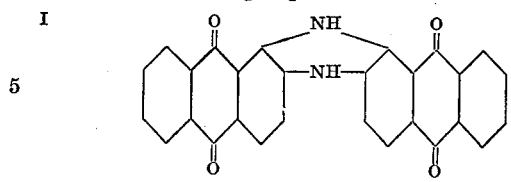

The fabrics are saturated with the preparation on the padding mangle, squeezed to 60 to 70% moisture content, dried and hardened for 5 minutes at 150° C. The rubbing fastness of the impregnated fabric patterns is excellent.

EXAMPLE 15

A nylon fabric is coated with a double layer of the following composition: 100 parts by weight of a 35% ethylacetate solution of the mixed polymer of 37 parts of vinylacetate, 45 parts of n-butylacrylate and 15 parts of product I, 3 parts of 1-vinyl-2,6-dioxo-(4,4)-spiro-8-epoxyundeca, 6 parts by weight of 70% butanolic solution of a melaminemethylolbutylether, 2 parts by weight glacial acetic acid.

The coated nylon fabric is dried for 15 to 20 minutes at 80° C. and hardened for 5 minutes at 150° C. The result is a nylon fabric highly resistant to trichlorethylene (7% loss in layer) and washable.

EXAMPLE 16

Cotton fabric is treated with the following preparation:

120 g./l. 50% aqueous solution of methylolmelamine-methylether and dimethylol ethylene urea dimethyl ether
30 g./l. 20% polyethylene emulsion
50 g./l. 40% aqueous emulsion containing a mixed polymer of 90 parts of n-butylacrylate and
10 parts of product I, 18 g./l. magnesiumchloride, citric acids (up to pH 6).

The saturated cotton fabric is placed on padding, mangle (60% squeezing effect), dried at 80° C. and hardened for 5 minutes at 150° to 155° C. It is then given a cold rinse for 5 minutes and a final 10 minutes wash at 40° C. with 1 g./l. condensation product of p-nonylphenol and 9 mol of ethyleneoxide.

The treated cotton fabric has a markedly improved crease resistance compared with the non-treated fabric.

What is claimed is:

1. New addition reaction homo-high polymers from monomeric esters of α,β-unsaturated carboxylic acids containing a cycloaliphatic ring in the alcohol residue, which esters are selected from the group consisting of compounds of the formula

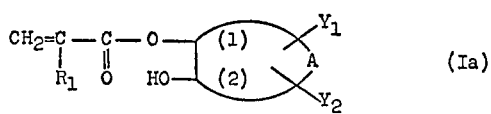

and compounds of the formula

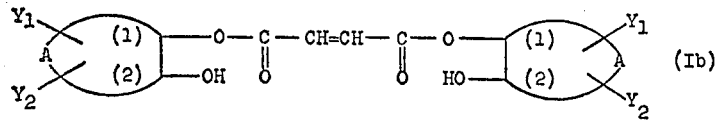

wherein $R_1$ is a member selected from the group consisting of a hydrogen atom and methyl group, A, together with the mono-substituted carbon atoms numbered (1) and (2) forms a member selected from the group consisting of a cyclopentane ring, a cyclohexane ring, an endomethylenecyclohexane ring, and a tetrahydrodicyclopentyldiene ring system, the endocyclic carbon atoms numbered (1) and (2) being vicinal, and wherein the residue $Y_1$ is a member selected from the group consisting of (a) a hydroxyl group (b) a group of formula —$CH_2O$—Z wherein Z is a member selected from the group consisting of hydrogen, $$CH_2=C-C-,\ CH_2-CH-CH_2-,\ H-(-OCH_2CH_2)_x-$$
$$\phantom{CH_2=}|\ \ \|\phantom{,\ CH_2-}\diagdown\phantom{O}\diagup$$
$$\phantom{CH_2=}R_1\ O\phantom{,\ CH_2-CH}O$$

wherein X is a whole number from 1 to 100, and a radical of the formula (c) [structure showing $CH_2=C-C-O-$ ring with $R_1$, O, HO, H, $CH_3$, $C=O$]

(d) [structure with $H_3CO$, HC—, $H_3CO$]

(e) [structure with $CH_2OH$, $CH_2-O$, C, CH—, $CH_2OH$, $CH_2-O$]

(e) [structure with $CH_2-O$, CH—, CH—O, $CH_2OH$]

and (f) [structure with $CH_2=C-C-O-$, $R_1$, O, HO, H, $CH_2-O$, CH—, $CH_2-O$]

$Y_2$ is a member selected from the group consisting of a hydrogen atom, a methyl group and a group of the formula —$CH_2O$—Z, wherein Z has the same significance as above and $Y_1$ and $Y_2$ when attached to the same carbon atom may form together a radical of the formula

[structure: $CH_2-O$, CH—CH=$CH_2$, $CH_2-O$]

2. New addition reaction high copolymers from (1) monomeric esters of α,β-unsaturated carboxylic acids containing a cycloaliphatic ring in the alcohol residue, which esters are selected from the group consisting of compounds of the formula $$CH_2=C-C-O-\begin{pmatrix}(1)\\(2)\end{pmatrix}_A \diagup Y_1 \diagdown Y_2 \quad (Ia)$$
$$\phantom{CH_2=}|\ \|\phantom{-O-}HO$$
$$\phantom{CH_2=}R_1\ O$$

and compounds of the formula $$Y_1 \diagdown \begin{pmatrix}(1)\\(2)\end{pmatrix}_A -O-C-CH=CH-C-O-\begin{pmatrix}(1)\\(2)\end{pmatrix}_A \diagup Y_1 \quad (Ib)$$
$$Y_2 \diagup\phantom{(2)}-OH\ \|\phantom{CH=CH}\|\ OH-\phantom{(2)}\diagdown Y_2$$
$$\phantom{Y_2(2)-OH}O\phantom{CH=CH}O$$

wherein $R_1$ is a member selected from the group consisting of a hydrogen atom and methyl group, A, together with the monosubstituted carbon atoms numbered (1) and (2) forms a member selected from the group consisting of cyclopentane ring, a cyclohexane ring, an endomethylenecyclohexane ring, and a tetrahydrodicyclopentadiene ring system, the endocyclic carbon atoms numbered (1) and (2) being vicinal, and wherein the residue $Y_1$ is a member selected from the group consisting of (a) hydroxyl (b) a group of formula —$CH_2O$—Z wherein Z is a member selected from the group consisting of hydrogen, $$CH_2=C-C-,\ CH_2-CH-CH_2-,\ H-(-OCH_2CH_2)_x-$$
$$\phantom{CH_2=}|\ \ \|\phantom{,\ CH_2-}\diagdown\phantom{O}\diagup$$
$$\phantom{CH_2=}R_1\ O\phantom{,\ CH_2-CH}O$$

wherein X is a whole number from 1 to 100, and a radical of the formula (c) [structure showing $CH_2=C-C-O-$ ring with $R_1$, O, HO, H, $CH_3$, $C=O$]

(d) [structure with $H_3CO$, HC—, $H_3CO$]

(d) [structure with $CH_2OH$, $CH_2-O$, C, CH—, $CH_2OH$, $CH_2-O$]

(e) [structure with $CH_2-O$, CH—, CH—O, $CH_2OH$]

(f) [structure with $CH_2=C-C-O-$, $R_1$, O, HO, H, $CH_2-O$, CH—, $CH_2-O$]

$Y_2$ is a member selected from the group consisting of a hydrogen atom, a methyl group and a group of the formula —$CH_2O$—Z, wherein Z has the same significance as above and $Y_1$ and $Y_2$ when attached to the same carbon atom may form together a radical of the formula

[structure: $CH_2-O$, CH—CH=$CH_2$, $CH_2-O$]

and (2) at least one other ethylenically unsaturated copolymerizable monomeric compound selected from the group consisting of vinyl esters, vinylalkyl ketones, vinylalkyl ethers, vinylhalides, vinylaryl compounds, esters of the acrylic acid series, acrylaminoes and polymerizable olefines.

3. New copolymers as claimed in claim 2, wherein monomer (2) is a member selected from the group consisting of acrylic acid esters and vinyl acetate.

4. New copolymers as claimed in claim 2, wherein monomer (2) is a member selected from the group consisting of acrylic acid esters and vinyl acetate.

5. New copolymers as claimed in claim 2 characterized in that they contain copolymerized 5 to 30% by weight of monomer (1) calculated on the total weight of the monomers and further an acrylic acid ester as comonomer.

References Cited

UNITED STATES PATENTS 3,275,583   9/1966   Kloos _____ 260—78

JOSEPH L. SCHOFER, *Primary Examiner.*

J. KIGHT, *Assistant Examiner.*

UNITED STATES PATENT OFFICE
CERTIFICATE OF CORRECTION

Patent No. 3,402,153

September 17, 1968

Horst Jaeger et al.

It is certified that error appears in the above identified patent and that said Letters Patent are hereby corrected as shown below:

Column 16, line 45, "acrylaminoes" should read -- acrylamid

Signed and sealed this 24th day of February 1970.

(SEAL)
Attest:

Edward M. Fletcher, Jr.
Attesting Officer

WILLIAM E. SCHUYLER, JR.
Commissioner of Patents